US009485121B2

(12) United States Patent
Dorman et al.

(10) Patent No.: US 9,485,121 B2
(45) Date of Patent: Nov. 1, 2016

(54) DIGITAL BAUD RATE CLOCK RECOVERY OF HEAVILY ISI-INDUCED SIGNALS

(71) Applicant: Multiphy Ltd., Ness Ziona (IL)

(72) Inventors: Guy Dorman, Mishmar David (IL); Dan Sadot, Kfar Bilu (IL); Albert Gorshtein, Ashdod (IL)

(73) Assignee: Multiphy Ltd., Ness Ziona (IL)

( * ) Notice: Subject to any disclaimer, the term of this patent is extended or adjusted under 35 U.S.C. 154(b) by 0 days.

(21) Appl. No.: 14/605,199

(22) Filed: Jan. 26, 2015

(65) Prior Publication Data

US 2015/0215138 A1   Jul. 30, 2015

Related U.S. Application Data

(60) Provisional application No. 61/931,743, filed on Jan. 27, 2014.

(51) Int. Cl.
*H03H 7/30* (2006.01)
*H04L 25/03* (2006.01)
*H04L 25/49* (2006.01)

(52) U.S. Cl.
CPC ..... *H04L 25/03076* (2013.01); *H04L 25/4917* (2013.01); *H04L 2025/0342* (2013.01); *H04L 2025/03636* (2013.01)

(58) Field of Classification Search
CPC ................................................. H04L 25/03057
USPC ......................................................... 375/233
See application file for complete search history.

(56) References Cited

U.S. PATENT DOCUMENTS

| 6,359,878 | B1 * | 3/2002 | Lakkis et al. ................. 370/350 |
| 6,377,529 | B1 * | 4/2002 | Lee et al. ..................... 369/59.1 |
| 8,611,451 | B1 * | 12/2013 | Sedarat ........................ 375/267 |
| 2003/0156635 | A1 * | 8/2003 | Fernandez-Corbaton et al. .............................. 375/232 |
| 2005/0220185 | A1 * | 10/2005 | Dowling ........................ 375/232 |
| 2006/0256892 | A1 * | 11/2006 | Momtaz ........................ 375/317 |
| 2007/0230640 | A1 * | 10/2007 | Bryan et al. .................. 375/349 |
| 2008/0080606 | A1 * | 4/2008 | Wang ................... H04L 7/0062 375/232 |
| 2009/0304064 | A1 * | 12/2009 | Liu et al. ....................... 375/232 |
| 2012/0269304 | A1 * | 10/2012 | Ciacci et al. ................. 375/342 |
| 2012/0314756 | A1 * | 12/2012 | Leibowitz et al. ........... 375/233 |
| 2014/0169442 | A1 * | 6/2014 | Hashida et al. .............. 375/233 |
| 2014/0198834 | A1 * | 7/2014 | Boritzki ........................ 375/226 |
| 2015/0016497 | A1 * | 1/2015 | Aziz et al. .................... 375/233 |

\* cited by examiner

*Primary Examiner* — Santiago Garcia
(74) *Attorney, Agent, or Firm* — Schwegman Lundberg & Woessner, P.A.

(57) ABSTRACT

System and method for digitally equalizing a data channel having wide channel impulse response for clock recovery of heavily ISI-induced received signals operating at one sample per symbol, according to which the received signal is pre-processed to provide a received signal with modified constellation, which is pre-processed for the decision process of signal with Inter-Symbol Interference by introducing controlled ISI to the received signal. The decision process is performed, based on a higher order vocabulary according to the introduced controlled ISI.

7 Claims, 5 Drawing Sheets

DIGITAL BAUD RATE CLOCK RECOVERY OF HEAVILY ISI-INDUCED SIGNALS

PRIORITY APPLICATIONS

This application claims the benefit of priority to U.S. Provisional Application Ser. No. 61/931,743, filed 27 Jan. 2014, which application is incorporated herein by reference in its entirety.

FIELD OF THE INVENTION

The present invention relates to the field of communication systems. More particularly, the invention relates to a method and system for digital clock timing recovery of heavily ISI-induced signals in digital modem links, operating at one sample per symbol.

BACKGROUND OF THE INVENTION

In digital modem links, a clock recovery mechanism is always required to sample the received signal for further digital signal processing, in order to demodulate the signal and extract the transmitted data therefrom. Some conventional clock recovery mechanisms operate at several samples per symbol. However, operating at several samples per symbol is more complicated and requires more processing.

One of the most popular mechanisms that operate at one sample per symbol uses the well-known Mueller and Muller algorithm.

Classic Mueller and Muller Algorithm

Assuming that the transmitted signal is given by:

$$y(t) = \sum_k a_k \cdot \delta(t - k \cdot T_{sym}) \quad [\text{Eq. 1}]$$

where
$a_n$—is the transmitted symbol.
h(t)—is the overall impulse response from transmitter (before DAC) to receiver (after ADC).
$T_{sym}$—is the baud (symbols/Sec) interval (given in Sec)
$\tau$—is the timing offset between the baud instance and the ADC sampling instance (given in Sec).

The received signal (before sampling and neglecting additive noise terms) could be written as:

$$r(t) = y(t) * h(t) \quad [\text{Eq. 2}]$$

$$r(t) = \sum_k a_k \cdot h(t - k \cdot T_{sym}) \quad [\text{Eq. 3}]$$

Assuming that the ADC sampling rate is correct (i.e., is equal to the baud rate) but with timing phase offset of $\tau$ sec, the received sampled signal can be written as:

$$r_n = r(t = n \cdot T_{sym} + \tau) \quad [\text{Eq. 4}]$$

$$r_n = \sum_k a_k \cdot h(n \cdot T_{sym} + \tau - k \cdot T_{sym}) \quad [\text{Eq. 5}]$$

The classic Mueller and Muller timing error signal is based on the following equation:

$$z_n = r_n \cdot a_{n-1} - r_{n-1} \cdot a_n \quad [\text{Eq. 6}]$$

It can be seen that the received sample value $r_n$ (which is available) and the data symbol value $a_n$ (which is usually not available) must be provided, in order to construct the timing error signal.

To show that the output, $z_k$, includes the timing error information ($\tau$), the expectation of the output ($z_k$) will be calculated:

$$z_n = r_n \cdot a_{n-1} - r_{n-1} \cdot a_n \quad [\text{Eq. 7}]$$

Here, the data symbols $a_n$ are generated by using a regular slicer.

$$z_n = \left( \sum_k a_k \cdot h(\tau + nT_{sym} - kT_{sym}) \right) \cdot a_{n-1} - \quad [\text{Eq. 8}]$$

$$\left( \sum_k a_k \cdot h(\tau + (n-1)T_{sym} - kT_{sym}) \right) \cdot a_n$$

$$z_n = \left( a_{n-1}^2 \cdot h(\tau + T_{sym}) + \sum_{k \neq n-1} a_k \cdot a_{n-1} \cdot h(\tau + nT_{sym} - kT_{sym}) \right) -$$

$$\left( a_n^2 \cdot h(\tau - T_{sym}) + \sum_{k \neq n} a_k \cdot a_n \cdot h(\tau + (n-1)T_{sym} - kT_{sym}) \right)$$

Performing the expectation:

$$E[z_n] = E[a_{n-1}^2] \cdot h(\tau + T_{sym}) - E[a_n^2] \cdot h(\tau - T_{sym}) \quad [\text{Eq. 9}]$$

where all the elements in the summations were zeroed, due to the expectation under the assumption that different symbols are independent and identically distributed:

$$E[a_n \cdot a_k] = E[a_n] \cdot E[a_k] = 0 \cdot 0 = 0 \quad [\text{Eq. 10}]$$

Therefore, the expectation is given by:

$$E[z_n] = \sigma_a^2 \cdot (h(\tau + T_{sym}) - h(\tau - T_{sym})) \quad [\text{Eq. 11}]$$

And the function $(h(\tau + T_{sym}) - h(\tau - T_{sym}))$ is an odd function.

For example, assuming that the channel impulse response is as illustrated in FIG. 1, The timing error function $(h(\tau + T_{sym}) - h(\tau - T_{sym}))$ would be in the form illustrated in FIG. 2, which is odd. It is clear from FIG. 2 that near the axis origin, the output includes the timing error information.

The problem with the classic Mueller and Muller algorithm is that it requires that the data symbols will be given. However, these symbols are not available at the receiver, as it is required to demodulate the received signal and extract the data symbols. If the channel impulse response is narrower than the baud interval, it is possible to use a simple slicer to extract the data symbols, assuming an eye opening in an eye diagram is available (an eye diagram, a display in which a digital data signal from a receiver is repetitively sampled and applied to the vertical input, while the data rate is used to trigger the horizontal sweep. It is used as a tool for the evaluation of the combined effects of channel noise and Inter-Symbol Interference on the performance of a baseband pulse-transmission system. An open eye pattern corresponds to minimal signal distortion. Distortion of the signal waveform due to inter-symbol interference and noise appears as closure of the eye).

In case where the channel impulse response is wider than the baud interval, the eye is closed and a simple slicer would cause too many errors that will not enable the Classic Mueller and Muller algorithm to work properly.

FIG. 3a illustrates a PAM-4 (4-level Pulse Amplitude Modulation) example, in which the eye opening for a narrow channel impulse response is shown. FIG. 3a shows that it is possible to distinguish between 4 PAM levels). However, FIG. 3b shows that for a wider channel impulse response, the eye has been closed and therefore, it would be impossible to distinguish between 4 discrete levels.

In many communication channels, including optical fiber channel with reduced bandwidth optoelectronic components (such as an optical modulator and demodulator, electronic driver and post amplifier), the impulse response of the channel would be wider than the baud interval and the eye would be closed. Consequently, it is not possible to place a simple slicer for extracting the data symbols for the classic Mueller and Muller algorithm.

It is therefore an object of the present invention to provide a method for digital clock timing recovery of heavily ISI-induced signals in digital modem links, while operating at one sample per symbol.

It is another object of the present invention to provide a method for recovering the digital clock timing, while reducing the complexity of the required hardware.

Other objects and advantages of the invention will become apparent as the description proceeds.

SUMMARY OF THE INVENTION

The present invention is directed to a system for digitally equalizing a data channel having wide channel impulse response for clock recovery of heavily ISI-induced signals, which comprises:

a) a one sample per symbol ADC, for sampling the received signal and converting it to a digital form;

b) a delay element for delaying the received signal by a predetermined time delay, required for sampling the received signal at appropriate timing:

c) a Timing Error Detector (TED) for detecting the timing error of the received signal, the Timing Error Detector having two inputs, one input for receiving a delayed sequence of the received signal samples and another input for receiving a filtered version of the data symbols;

d) a Feed-Forward Equalizer (which may be implemented by a FIR filter) with a predetermined number of taps, for receiving the signal samples and introducing correction factors to the ISI added to the samples of the received signal by the data channel, to thereby generate modified data symbols with controlled ISI and modified constellation;

e) a decision circuit, fed by the Feed-Forward Equalizer, for extracting the modified data symbols from the received signal and for generating an error signal used to adjust the taps of the FFE; and f) an adaptive filter for producing the least mean squares of the error signal and inputting the least mean squares into the FFE for adjusting and optimizing its tap coefficients, according to the channel dynamics.

The timing error signal at the output of the TED is produced using a modified Mueller and Muller algorithm for a wide channel impulse response.

The system may be adapted to perform clock recovery for high order modulations, including:
  PAM-2;
  PAM-4;
  PAM-8;
  PAM-16;
  Quadrature Phase Shift Keying (QPSK);
  QAM-8;
  QAM-16.

The system may also be adapted to perform clock recovery for dada networks, including:
  data center intra-connection
  data center interconnection;
  metropolitan point-to-point connections;
  metropolitan Wavelength-Division Multiplexing (WDM).

The FFE taps may be adapted to use a Least Mean Square (LMS) filter, producing the least mean squares of the error signal.

The present invention is also directed to a method for digitally equalizing a data channel having wide channel impulse response for clock recovery of heavily ISI-induced received signals operating at one sample per symbol, comprising:

a) pre-processing the received signal to provide a received signal with modified constellation;

b) optimizing the modified constellation for the decision process of signal with Inter-Symbol Interference by introducing controlled ISI to the received signal; and c) performing the decision process, based on a higher order vocabulary according to the introduced controlled ISI.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

The present invention discloses a novel digital equalization method and system for baud rate clock recovery of heavily ISI-induced signals, which uses a one sample per symbol ADC and a modified Mueller and Muller algorithm, for a typical wide channel impulse response.

Figure 1:
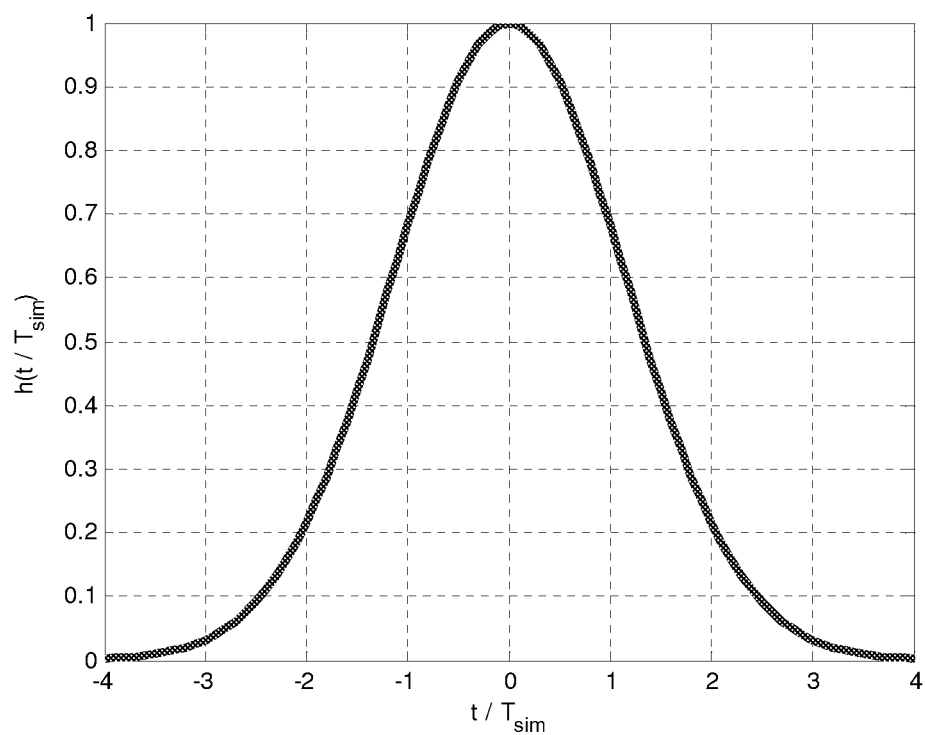
FIG. 1 (prior art) illustrates an example of the impulse response of a typical data channel.
Figure 2:
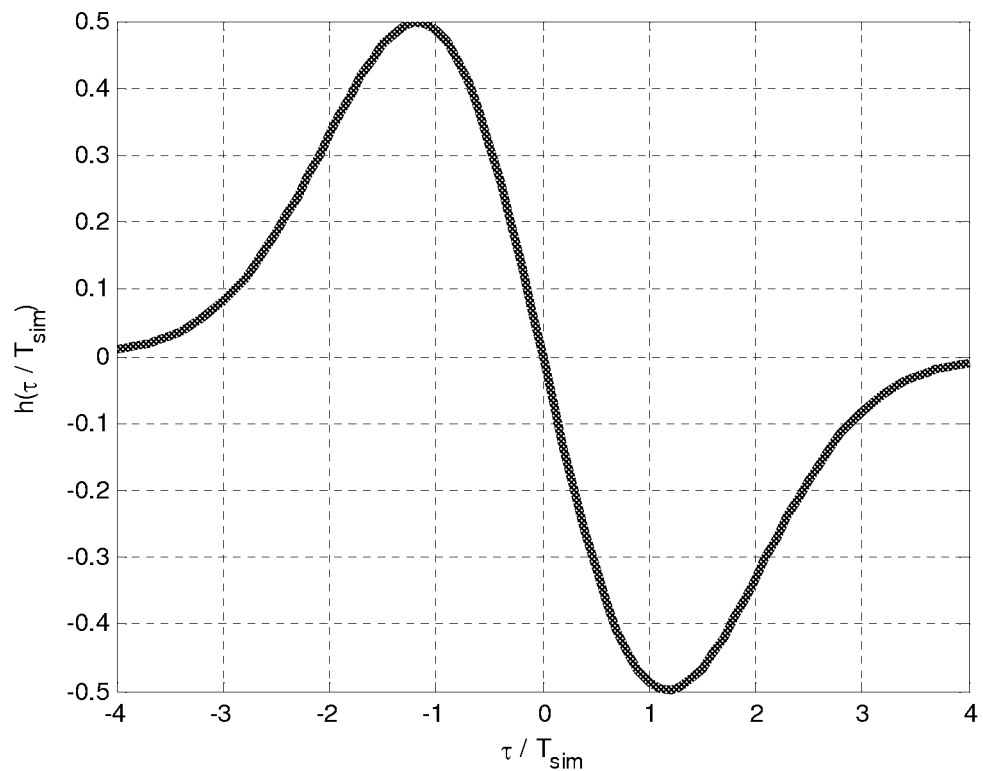
FIG. 2 (prior art) illustrates an example of the timing error which is presented by the function $(h(\tau+T_{sym})-h(\tau-T_{sym}))$, where h is the impulse response shown in FIG. 1.
Figure 3A:
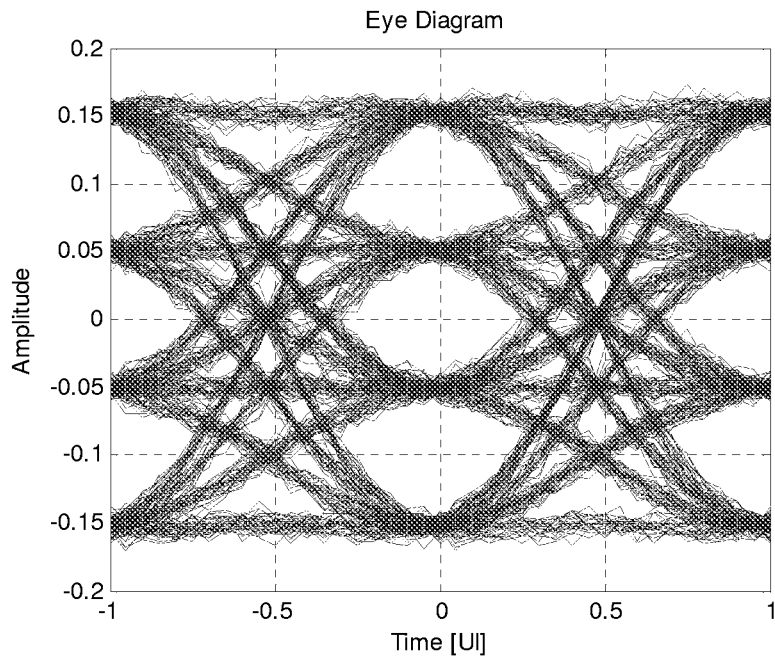
FIG. 3a (prior art) illustrates the eye opening of a PAM-4 for a narrow channel impulse response.
Figure 3B:
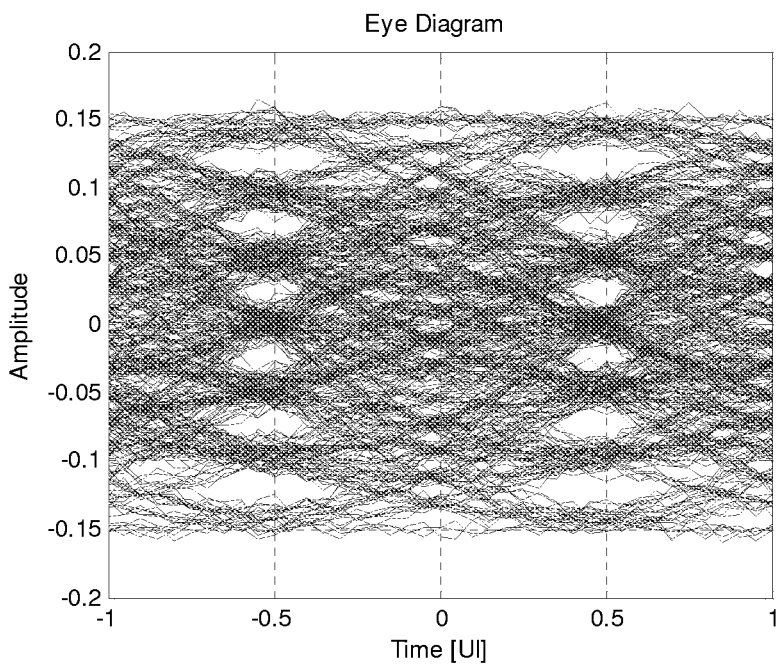
FIG. 3b (prior art) illustrates the eye opening of a PAM-4 for a wider channel impulse response.
Figure 4:
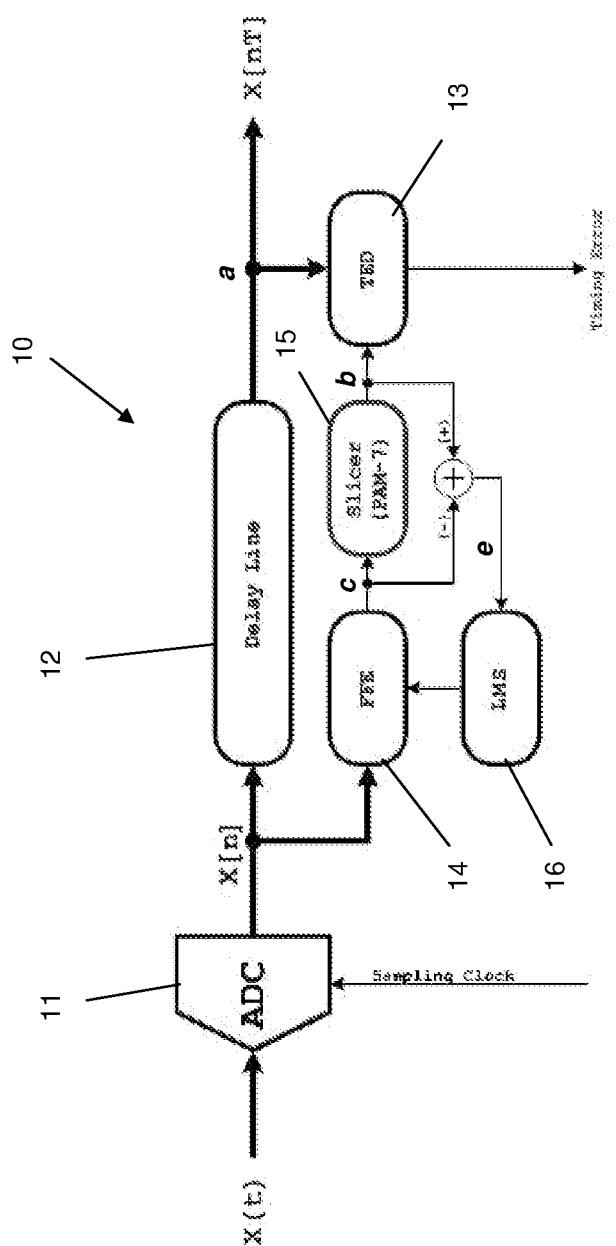
FIG. 4 shows a block diagram of a digital equalization system for baud rate clock recovery of heavily ISI-induced signals, according to an embodiment of the invention.

FIG. 4 shows a block diagram of a digital equalization system for baud rate clock recovery of heavily ISI-induced signals, according to an embodiment of the invention. In the proposed system, the received signal is pre-processed to provide a modified constellation diagram which is optimized for the decision process of signal with Inter-Symbol Interference (ISI—a form of distortion of a signal in which one symbol interferes with subsequent symbols), using controlled ISI that is introduced to the received signal. The introduced controlled ISI is optimized for the decision process of a signal with ISI. The decision process is performed, based on higher order vocabulary according to the introduced controlled ISI.

The digital equalization system 10 includes a one sample per symbol ADC 11 for sampling the received signal x(t) and converting it to a digital form x[n], a delay line 12 for delaying the received signal by a time delay T (required to delay the received symbol for resampling it at appropriate timing) and a Timing Error Detector (TED) 13 with two inputs. The TED 13 receives a delayed version signal x(nT) of the received signal samples x[n] in its first input a and a filtered version of the data symbols at its second input b.

As we can see, the Timing Error Detector (TED) 13 receives at its input (a), a delayed version of the received signal and at its other input (b), a filtered version of the data symbols.

The filtered (modified) version of the original data symbols is constructed by virtually passing the original data symbols through a virtual FIR filter with an impulse response of [1/2 1/2] (which is a virtual filter that is applied on the originally transmitted PAM-4 symbols in this example, as shown by Eq. 12 below).

If the inputs to this virtual FIR filter are PAM-4 symbols, then the output of this FIR filter would look like PAM-7 symbols $b_n$ (expressed in Eq. 12), for the impulse response of [1/2 1/2]. The FIR output $b_n$ could be sliced by a PAM-7 slicer 15 and the slicer error e could be used to adapt the taps (correction factors) of a Feed-Forward Equalizer (FFE) 14 with a Least Mean Square (LMS) filter 16 (least mean squares of the error signal e). This type of equalizer does not try to invert the channel and reconstruct the original PAM-4 symbols, but it tries to convert the channel into a modified channel of the type [1/2 1/2].

This slicing technique significantly relaxes the aggressive task of the (FIR implemented) FFE 14, and in turn, avoids the significant noise enhancement effect associated with the LMS-based FFE functionality.

Inverting the channel into a modified channel of the type [1/2 1/2] is an easier task, since the FIR does not try to reconstruct the high frequency components of the original signal.

In this case, the FFE 14 is adapted to converge into a modified target constellation of the modified symbols, taken from the new vocabulary (resulting from virtually passing the transmitted symbols through the imaginary FIR filter), which is the resulting new PAM-7 symbols.

The description below shows that the functionality of TED 13 is maintained even when feeding it with the modified data symbols (of type PAM-7) instead of the original data symbols (of type PAM-4).

The modified data symbols can be defined as:

$$b_n = (a_n + a_{n-1})/2 \quad [Eq. 12]$$

In this example, the modified data symbols $b_n$ are selected to be the average of the current symbol and the previous symbols, but of course, other combinations are possible. Using the modified data symbols $b_n$ rather than the original symbols $a_n$ is equivalent to introducing controlled ISI to the received signal.

It is possible to calculate the output from the modified Mueller and Muller function (TED 13):

$$z_n = r_n \cdot b_{n-1} - r_{n-1} \cdot b_n \quad [Eq. 13]$$

This way, a new symbol dictionary (or a new "target constellation") is constructed by modifying the original PAM-4 symbols into new PAM-7 symbols. Consequently, a new PAM-7 slicer mechanism is generated, in order to extract the new PAM-7 symbols $b_n$ that are used in the modified Muler and Muler function. For example, if the original PAM-4 constellation comprises 4 symbols (with values 0, 1, 2, 3), the new PAM-7 symbols ($b_n$) will be 0, 0.5, 1, 1.5, 2, 2.5 and 3).

$$z_n = r_n \cdot (a_{n-1} + a_{n-2})/2 - r_{n-1} \cdot (a_n + a_{n-1})/2 \quad [Eq. 14]$$

-continued $$z_n = \frac{1}{2} r_n a_{n-1} + \frac{1}{2} r_n a_{n-2} - \frac{1}{2} r_{n-1} a_n - \frac{1}{2} r_{n-1} a_{n-1} \quad [Eq. 15]$$

The expectation of this term is calculated as:

$$E[z_n] = \frac{1}{2}(E[r_n a_{n-1}] + E[r_n a_{n-2}] - E[r_{n-1} a_n] - E[r_{n-1} a_{n-1}]) \quad [Eq. 16]$$

In general:

$$E[r_{n-k} a_{n-m}] = E\left[\sum_l a_l \cdot h((n-k-l) \cdot T_{sym} + \tau) \cdot a_{n-m}\right] = \quad [Eq. 17]$$

$$E\left[\left(a_{n-m} \cdot h((m-k) \cdot T_{sym} + \tau) + \sum_{l \neq (n-m)} a_l \cdot h((n-k-l) \cdot T_{sym} + \tau)\right) \cdot a_{n-m}\right] =$$

$$E\left[\left(a_{n-m}^2 \cdot h((m-k) \cdot T_{sym} + \tau) + a_{n-m} \cdot \sum_{l \neq (n-m)} a_l \cdot h((n-k-l) \cdot T_{sym} + \tau)\right)\right] =$$

$$\sigma_a^2 \cdot h((m-k) \cdot T_{sym} + \tau)$$

Eq. 17 shows that it is still possible accurately to extract the timing information of the channel, even after using the modified symbols $b_n$.

$$E[z_n] = \frac{\sigma_a^2}{2} \cdot [h(T_{sym} + \tau) + h(2T_{sym} + \tau) - h(-T_{sym} + \tau) - h(\tau)] \quad [Eq. 18]$$

Figure 5:
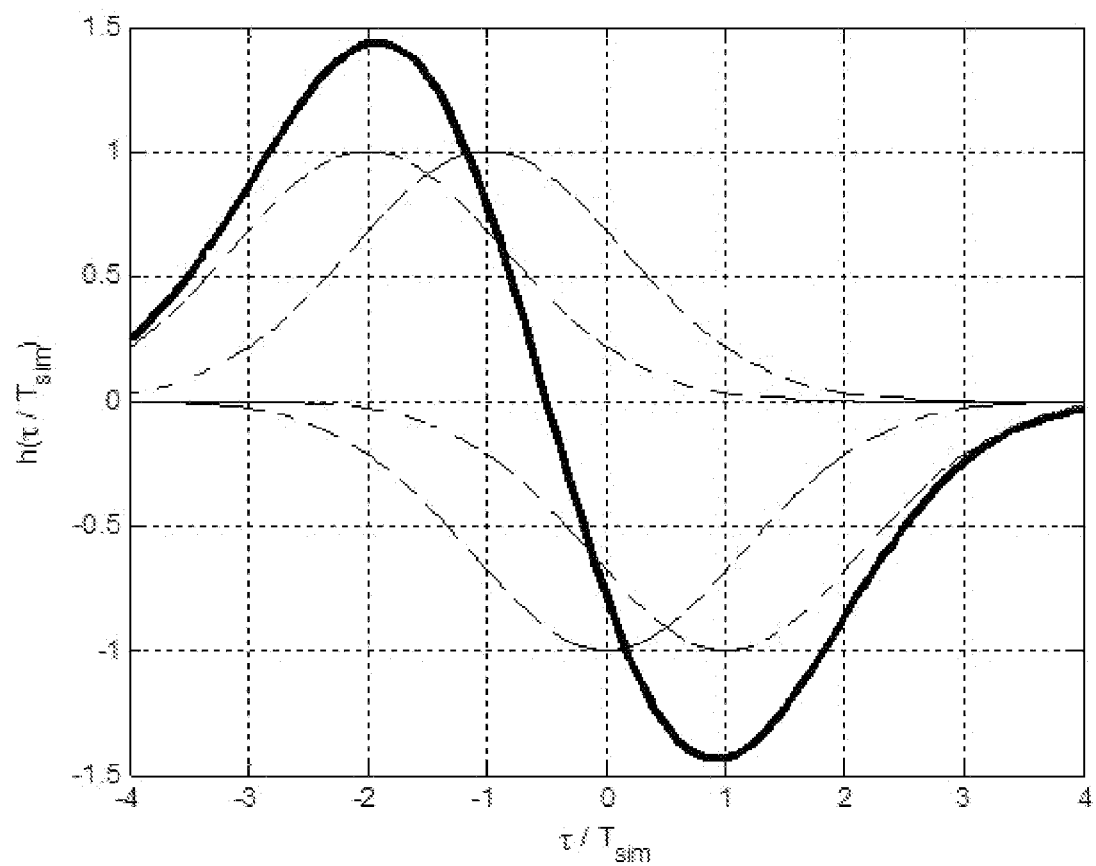
FIG. 5 shows the expectation of the timing error signal at the output of TED for the Modified Mueller and Muller algorithm, for a typical wide channel impulse response.

FIG. 5 shows the expectation of the timing error signal at the output of TED 13 (solid line) for the Modified Mueller and Muller algorithm (for a typical wide channel impulse response). The expectation of timing error is comprised of the combination of the 4 impulse responses (dashed curves) expressed in Eq. 18, shifted by one symbol time from each other by one symbol time.

It can be clearly seen that this function includes the timing error information.

The proposed digital equalization method and system may be adapted to perform clock recovery for high order modulations, including (but not limited to) PAM-2, PAM-4, PAM-8, PAM-16, Quadrature Phase Shift Keying (QPSK), QAM-8 (8-level Quadrature Amplitude Modulation), QAM-16, as well as applications such as data center intra-connection, data center interconnection, metropolitan point-to-point connections and metropolitan Wavelength-Division Multiplexing (WDM). The proposed system is able to generate a modified decision process, based on higher order vocabulary including (but not limited to) high order PAM (PAM-7 for original PAM-4 signal) and the like, as well as the generation of a timing error control signal, based on Mueller and Muller timing error function with modified decision vocabulary.

The above examples and description have of course been provided only for the purpose of illustration, and are not intended to limit the invention in any way. As will be appreciated by the skilled person, the invention can be carried out in a great variety of ways, employing more than

What is claim is:

1. A system for digitally equalizing a data channel having wide channel impulse response for clock recovery of heavily Inter-Symbol Interference induced (ISI-induced) signals, comprising:
   a) a one sample per symbol analog-to-digital converter (ADC), for sampling the received signal and converting it to a digital form;
   b) a delay element for delaying said received signal by a predetermined time delay, required for sampling said received signal at appropriate timing;
   c) a modified Muller & Mueller Timing Error Detector (TED) for detecting the timing error of said received signal, said Timing Error Detector having two inputs, one input for receiving a delayed sequence of the received signal samples and another input for receiving a filtered version of the data symbols being modified data symbols, with controlled ISI and modified constellation;
   d) a Feed-Forward Equalizer having a predetermined number of taps, for receiving said signal samples and introducing correction factors to the ISI added to the samples of said received signal by said data channel, to thereby generate the modified data symbols;
   e) a decision circuit, fed by said Feed-Forward Equalizer (FFE), for extracting the modified data symbols from the received signal and for generating an error signal used to adjust the taps of said FFE; and
   f) an adaptive filter for producing the least mean squares of said error signal and inputting said least mean squares into said FFE for adjusting and optimizing its tap coefficients, according to the channel dynamics.

2. A system according to claim 1, in which the Feed-Forward Equalizer is implemented by a Finite Impulse Response (FIR) filter.

3. A system according to claim 1, in which the timing error signal at the output of the TED is produced using a modified Mueller and Muller algorithm for a wide channel impulse response.

4. A system according to claim 1, being adapted to perform clock recovery for high order modulations, including:
   PAM-2;
   PAM-4;
   PAM-8;
   PAM-16;
   Quadrature Phase Shift Keying (QPSK);
   QAM-8;
   QAM-16.

5. A system according to claim 1, being adapted to perform clock recovery for dada networks, including:
   data center intra-connection
   data center interconnection;
   metropolitan point-to-point connections;
   metropolitan Wavelength-Division Multiplexing (WDM).

6. A system according to claim 1; in which the FIT taps are adapted using a Least Mean Square (LMS) filter, producing the least mean squares of the error signal.

7. A system according to claim 1, in which the data channel is converted into a modified channel having an impulse response of [1/2 1/2].

* * * * *